(12) United States Patent
Favata

(10) Patent No.: US 8,794,818 B2
(45) Date of Patent: Aug. 5, 2014

(54) METHOD OF DECREASING ACETALDEHYDE LEVEL IN A MOLDED ARTICLE

(75) Inventor: Domenico Favata, Konz (DE)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 955 days.

(21) Appl. No.: 12/866,296

(22) PCT Filed: Jan. 30, 2009

(86) PCT No.: PCT/CA2009/000098
§ 371 (c)(1),
(2), (4) Date: Sep. 28, 2010

(87) PCT Pub. No.: WO2009/103145
PCT Pub. Date: Aug. 27, 2009

(65) Prior Publication Data
US 2011/0172318 A1 Jul. 14, 2011

Related U.S. Application Data

(63) Continuation-in-part of application No. 12/034,963, filed on Feb. 21, 2008.

(51) Int. Cl.
| | |
|---|---|
| B29C 45/54 | (2006.01) |
| B29C 45/76 | (2006.01) |
| B29C 45/00 | (2006.01) |
| B29C 45/18 | (2006.01) |
| B29K 67/00 | (2006.01) |
| B29C 37/00 | (2006.01) |

(52) U.S. Cl.
CPC ............ *B29C 45/0001* (2013.01); *B29C 45/76* (2013.01); *B29C 2945/76652* (2013.01); *B29C 2945/76147* (2013.01); *B29C 45/1816* (2013.01); *B29C 2945/76143* (2013.01); *B29C 2945/76816* (2013.01); *B29C 2945/76545* (2013.01); *B29C 2945/76846* (2013.01); *B29C 2945/76809* (2013.01); *B29K 2067/00* (2013.01); *B29C 2945/7629* (2013.01); *B29C 2945/76555* (2013.01); *B29C 2945/76214* (2013.01); *B29C 45/54* (2013.01); *B29C 2945/7605* (2013.01); *B29C 2945/76367* (2013.01); *B29C 2037/92* (2013.01); *B29C 2945/7618* (2013.01)
USPC ........................................ 366/76.2; 366/152.1

(58) Field of Classification Search
CPC ...... B29C 45/1816; B29C 45/54; B29C 45/76
USPC ............................................. 366/76.2, 152.1
See application file for complete search history.

(56) References Cited

U.S. PATENT DOCUMENTS 3,383,096 A * 5/1968 Braibanti et al. ............ 366/76.2
3,410,530 A * 11/1968 Gilman ........................ 366/76.2

(Continued)

FOREIGN PATENT DOCUMENTS

| CA | 2186441 A1 | 3/1997 |
| EP | 1400332 A1 | 3/2004 |

(Continued)

OTHER PUBLICATIONS

"Magazin Aufbereitung. Eine Rationelle Loesung", Kunstoffberater, 201975 1, vol. 38, No. 3, Mar. 1, 1993, pp. 6-07.

*Primary Examiner* — David Sorkin

(57) ABSTRACT

There is provided a method (200) for decreasing acetaldehyde level in a molded article. The method (200) of decreasing acetaldehyde content in a molded article to be produced comprises introducing (202) into a feed throat (120) of an injection unit (100) a PET material to be plasticized, the PET material having been dried in a pre-treatment chamber (130); and introducing (204) into the feed throat (120) an un-treated agent (136) configured to increase moisture level of the PET material to be plasticized. In some embodiments of the present invention, the un-treated agent (136) is also configured to provide additional lubrication to the plasticizing screw (106).

11 Claims, 2 Drawing Sheets

(56) References Cited

U.S. PATENT DOCUMENTS

| | | |
|---|---|---|
| 6,344,166 B1 | 2/2002 | Aoki et al. |
| 6,669,358 B2 * | 12/2003 | Shimoda ........................ 366/76.2 |
| 7,041,350 B1 | 5/2006 | Rule et al. |
| 2002/0094402 A1 | 7/2002 | Jen |
| 2006/0264599 A1 | 11/2006 | Anno et al. |
| 2007/0001344 A1 | 1/2007 | Weinmann et al. |
| 2009/0213682 A1 * | 8/2009 | Favata ........................ 366/76.1 |

FOREIGN PATENT DOCUMENTS

| | | |
|---|---|---|
| JP | 10128748 A | 5/1998 |
| JP | 2003211491 A | 7/2003 |

* cited by examiner

METHOD OF DECREASING ACETALDEHYDE LEVEL IN A MOLDED ARTICLE

TECHNICAL FIELD

The present invention generally relates to, but is not limited to, a molding system, and more specifically the present invention relates to, but is not limited to, a method of decreasing acetaldehyde level in a molded article.

BACKGROUND OF THE INVENTION

Molding is a process by virtue of which a molded article can be formed from molding raw material by using a molding system. Various molded articles can be formed by using the molding process, such as an injection molding process. One example of the molded article that can be formed, for example, from polyethylene terephthalate (PET) material is a preform that is capable of being subsequently blow-molded into a beverage container, such as, a bottle and the like. Other examples of the molded articles include thin-wall containers (i.e. yogurt containers, cups, etc), medical appliances and the like.

PET has received wide acceptance for producing various molded articles, including packaging containers, beverage packaging containers, medical appliances and other numerous molded articles. However, PET as molding raw material still suffers from some drawbacks that may be restrictive to further expansion of the areas of applicability of PET. For example, PET has tendency to degrade and generate acetaldehyde when it is heat-processed. Several factors are known to negatively affect occurrence and amount of the generated acetaldehyde, such as: pressure levels, extruder speeds, shear levels, residence time and the like. A molecule of the acetaldehyde is comparatively smaller vis-à-vis the molecule structure of the PET and due to this size disparity, the molecule of acetaldehyde can migrate through the PET to the interior of the molded article and a substance that is eventually maintained within the molded article (such as, for example, a beverage and the like).

Generally speaking, the taste of the acetaldehyde can be categorized as "fruity". Even though acetaldehyde is a natural occurring flavourant in certain fruits; for many types of food products and beverages, the taste of so-migrated acetaldehyde may be detrimental. For example, presence of such fruity flavor may not be noticed or, if noticed, not considered to be a nuisance when consuming an orange juice beverage or another strongly flavored beverage. However, presence of such fruity flavor may not be well accepted when consuming a spring water beverage, the taste of which is supposed to be "clean" and "natural". Accordingly, for certain molded articles produced from PET for certain applications the acceptable threshold for the migration of acetaldehyde molecules (and the associated taste) from the molded article into the food or beverage item maintained therein will be much lower.

It is worthwhile noting that acetaldehyde can be produced during different stages of a processing life cycle of the PET material: (a) when PET is synthesized and PET granules are initially prepared, (b) when PET granules are re-heated during plasticizing while manufacturing preforms, (c) when the preforms are reheated for blow-molding into the final shape container.

Several methods have been proposed to decrease the content of acetaldehyde in the molded articles, the so-proposed method targeting one or more of the above-described processing life cycle stages of the PET material U.S. Pat. No. 7,041,350 issued to Rule et al. on May 9, 2006 discloses a polyester composition with reduced acetaldehyde concentration comprising polyester, at least one hydrogenation catalyst, and at least one source of reactive hydrogen. A method for making the polyester composition is also disclosed along with polyester articles made with the polyester composition. Suitable articles include containers such as bottles. A packaged beverage comprising a container made with the polyester composition is disclosed.

US patent application 2002/0094402 published on Jul. 18, 2002 by Jen discloses a manufacturing method of copolyester for low acetaldehyde content of PET bottles. The polyethylene terephthalate (PET) polymer is added with an appropriate modifier in order to decrease the production of acetaldehyde caused by pyrolysis side reaction during the blow molding process of PET bottles. The modifier comprises stabilizer and primary antioxidant, wherein the stabilizer is an inorganic phosphorous compound with an addition quantity of 0.003~0.5 weight % based on the weight of the total copolyester copolymer and the primary antioxidant is a hindered phenolic antioxidant containing $Ca^{+2}$ with an addition quantity of 0.005~5.0 weight % based on the weight of the total copolyester copolymer. The present invention owns an improving effect of decreasing the production of side product—acetaldehyde at least 30% than those without the addition of said modifier.

U.S. Pat. No. 6,344,166 issued to Aoki, et al. on Feb. 5, 2002 discloses a container molding method for decreasing the amount of released acetaldehyde. The method comprises a primary blow molding step of stretch-blow-molding a preform into a primary blow-molded article; an acetaldehyde decreasing step of decreasing the amount of acetaldehyde released from the primary blow-molded article; and a final blow molding step of stretch-blow-molding the primary blow-molded article having a reduced amount of acetaldehyde into a final container. The primary blow molding step molds the primary blow-molded article which is larger in size than the final container and which has an average wall-thickness of a stretched barrel portion equal to or less than 0.3 mm, that is smaller than the average wall-thickness of a barrel portion of the final container. The acetaldehyde decreasing step heats the thin-walled barrel portion of the primary blow-molded article at a high temperature for a relatively short time. As a result, the final container having a reduced amount of acetaldehyde released from the inner wall of the final container will be molded.

SUMMARY OF THE INVENTION

According to a first broad aspect of the present invention, there is provided a method of decreasing acetaldehyde content in a molded article to be produced. The method comprises introducing into a feed throat of an injection unit a PET material to be plasticized, the PET material having been dried in a pre-treatment chamber; and introducing into the feed throat an agent configured to increase moisture level of the PET material to be plasticized.

According to a second broad aspect of the present invention, there is provided an injection unit comprising an inlet having a feed throat for accepting, in use, PET material that has been dried in a pre-treatment chamber; a plasticizing sub-system for plasticizing the PET material into plasticized material; an outlet for outputting the plasticized material; the inlet being associated with a dosing unit configured to introduce into the feed throat an un-treated agent configured to increase moisture level of the PET material to be plasticized.

According to a third broad aspect of the present invention, there is provided a method of decreasing acetaldehyde content in a molded article to be produced. The method comprises introducing into a feed throat of an injection unit a PET material to be plasticized, the PET material having been dried in a pre-treatment chamber; introducing into the feed throat an un-treated agent, the un-treated agent having one of an amorphous structure and a semi-crystalline structure, the un-treated agent configured to increase moisture level of the PET material to be plasticized and to provide additional lubrication to a plasticizing screw of the injection unit.

According to another broad aspect of the present invention, there is provided a method of decreasing acetaldehyde content in a molded article to be produced. The method comprises introducing into a feed throat of an injection unit a PET material to be plasticized, the PET material having been dried in a pre-treatment chamber; introducing into the feed throat an un-treated agent, the un-treated agent selected from a list including:
   un-treated PET material;
   re-pelletized re-cycled PET,
   post-consumer recycled PET flakes,
   PET preform re-grind,
   PET bottle re-grind,
   PET re-grind, and
   a combination of at least some thereof.

According to another broad aspect of the present invention, there is provided a method of decreasing acetaldehyde content in a molded article to be produced, the method comprising: introducing into a feed throat of an injection unit molding raw material to be plasticized, the molding raw material having been dried in a pre-treatment chamber; introducing into the feed throat an un-treated agent configured to increase moisture level of the molding raw material to be plasticized.

According to yet another broad aspect of the present invention, there is provided injection unit that comprises an inlet having a feed throat, the inlet being operatively connectable, in use, to a pre-treatment chamber to accept PET material having been dried in the pre-treatment chamber and to a source of an un-treated PET material via a dosing unit; a plasticizing sub-system for plasticizing the PET material and the un-treated PET material into plasticized material; an outlet for outputting the plasticized material; the dosing unit being configured to introduce into the feed throat an amount of the un-treated PET material, thereby to at least decrease content of acetaldehyde produced during plasticizing.

These and other aspects and features of non-limiting embodiments of the present invention will now become apparent to those skilled in the art upon review of the following description of specific non-limiting embodiments of the invention in conjunction with the accompanying drawings.

BRIEF DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE PREFERRED EMBODIMENT(S)

Embodiments of the present invention have been developed based on the inventor's appreciation of at least one disadvantage associated with the prior art approaches to decreasing acetaldehyde content in molded articles.

For example, those approaches in the prior art where additives (such as, for example, acetaldehyde inhibitors) are added to the PET raw material either during manufacturing of the PET granules or during plasticizing of the PET, can significantly increase manufacturing costs due to the high costs of such additives.

As another example, those approaches that subject the preform to an acetaldehyde decreasing treatment during the blow-molding process can also significantly increase capital costs, as those methods require adaptation of each blow-molding mold for the specific treatment. Within those methods, if it desirable to change the shape of the blow-molded article, the new blow-molding mold will need to be adapted to carry out the treatment process, again significantly increasing capital costs.

Figure 1:
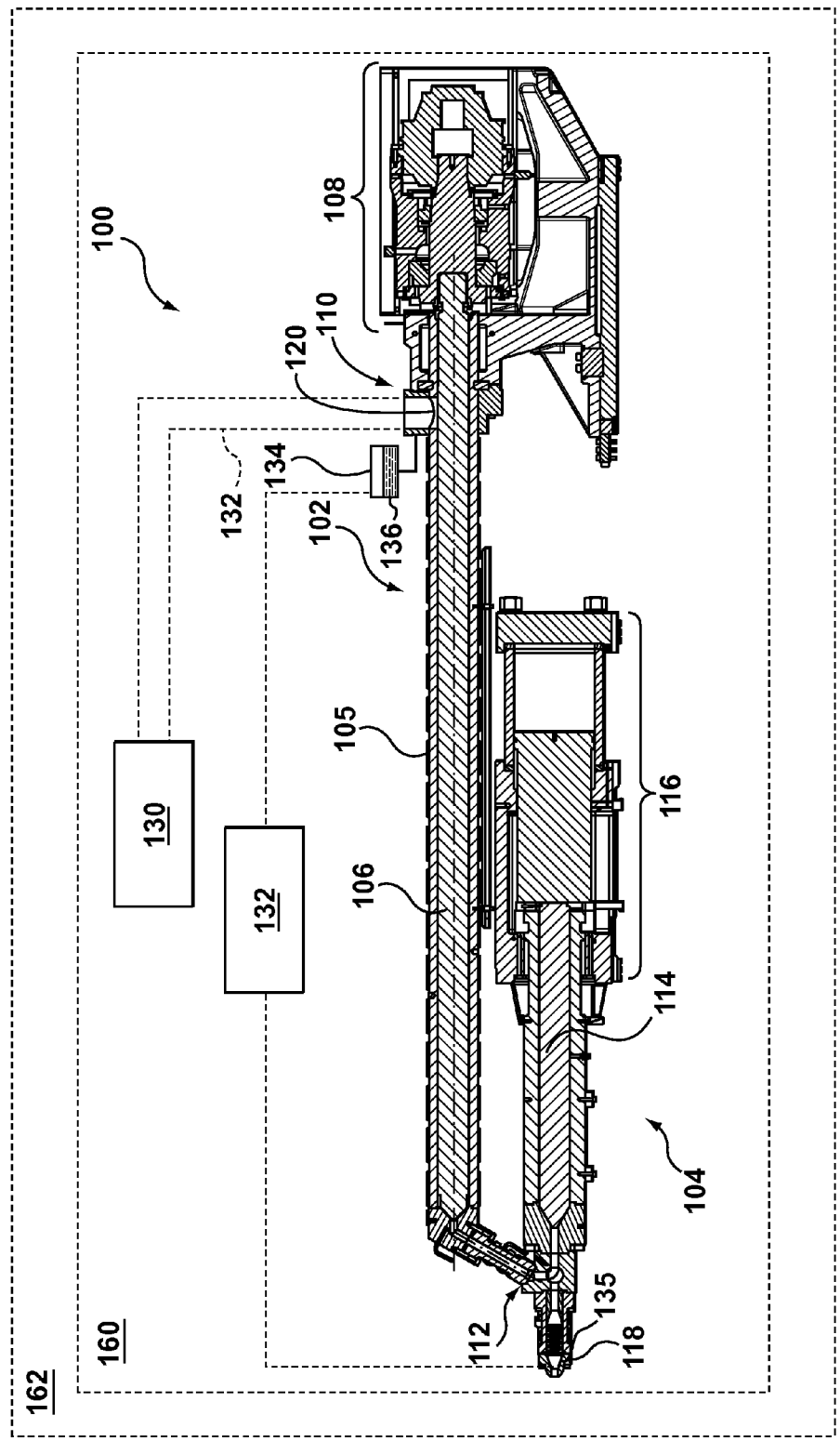
FIG. 1 depicts a sectional view of an injection unit 100 which can be adapted for implementing non-limiting embodiments of the present invention.

With reference to FIG. 1, there is depicted a non-limiting embodiment of an injection unit 100 that can be configured to implement non-limiting embodiments of the present invention. The injection unit 100 can be part of an injection molding machine 160, which is only conceptually depicted in FIG. 1, but well known to those skilled in the art. The injection molding machine 160 can be configured for manufacturing of various molded articles. Purely as means of an example for illustrating embodiments of the present invention, it shall be assumed that the injection unit 100 is part of the injection molding machine 160 configured for manufacturing of preforms, which are suitable for subsequent blow-molding into beverage containers. However, it should be expressly understood that embodiments of the present invention are not so limited and can be equally implemented within context of other type of injection equipment.

Within this non-limiting illustration of embodiments of the present invention, the injection unit 100 can be of a two-stage type and to that extent, the injection unit 100 can comprise a barrel 102 and a shooting pot 104. Within the barrel 102, there is provided a plasticizing screw 106 which is actuated by a plasticizing screw actuator 108. Within these embodiments of the present invention, the plasticizing screw actuator 108 imparts rotational and reciprocal movements to the plasticizing screw 106. The barrel 102 is associated with a plurality of barrel heaters 105. Combination of the rotation of the plasticizing screw 106 and the heat emitted by the plurality of barrel heaters 105 causes molding raw material (which within examples provided herein below comprises PET material) fed through an inlet 110 to melt until a desired amount of material at a desired molten state has been produced and accumulated in front of the plasticizing screw 106. Accumulation of the desired amount of material in front of the plasticizing screw 106 causes the plasticizing screw 106 to translate backwardly (i.e. in the right-bound direction if viewed in FIG. 1). The desired amount of material is then transferred into the shooting pot 104 via a transfer portion 112 by means of reciprocal movement of the plasticizing screw 106. Suitable configurations of the transfer portion 112 are well known to those of skill in the art and, as such, need not be described here at any length. The shooting pot 104 includes a plunger 114 which is actuated by a plunger actuator 116. The plunger actuator 116 impacts a lateral movement to the plunger 114, which causes the accumulated desired amount of material to be transferred into a mold (not depicted) via a nozzle 118.

To facilitate feeding of the PET material through the inlet 110, the inlet 110 can be provided with a hopper (not depicted) or other suitable flow directing means (not depicted), which are known to those of skilled in the art. The inlet 110 can be said to define a feed throat 120, the feed throat 120 being defined where the inlet 110 meets the barrel 102.

Accordingly, generally speaking the injection unit 100 can be said to include the inlet 110 for accepting PET material, the nozzle 118 for outputting the plasticized material and a melt processing sub-system for plasticizing PET material into the plasticized material (the melt processing sub-system including some or all of the barrel 102, shooting pot 104, the plurality of barrel heaters 105, the plasticizing screw 106, plasticizing screw actuator 108, transfer portion 112, plunger 114, plunger actuator 116).

It is a common practice to pre-treat PET material before feeding it into the barrel 102 via the inlet 110. The common wisdom in the molding art prescribes removal of substantially all the moisture from the molding raw material, such as PET, during this pre-treatment process. This is done due to the fact that moisture content in the molding raw material, such as PET, leads to hydrolysis between water and PET, resulting in reduced molecular weight, degradation of other physical properties, etc. It has also been believed that the more moisture removed from the PET prior to plasticizing, the lower the content of produced acetaldehyde during melting of the PET is. Embodiments of the present invention have further been developed based on at least a realization that over-treating of PET material can actually increase generation of the acetaldehyde, since overheating can make the structure of PET more "brittle" and conducive to degradation. Embodiments of the present invention allow to reap all the benefits traditionally enjoyed by pre-heating of the PET raw material (ex. prevention of decreasing the molecular weight, etc.), while at least decreasing levels of generated acetaldehyde.

Accordingly, within the architecture of FIG. 1, there is provided a pre-treatment chamber 130 associated with the molding system 162 that houses the injection molding machine 160 that incorporates the injection unit 100. The pre-treatment chamber 130 can be configured to implement one or more pre-treatment routines, such as, but not limited to: drying, de-humidifying and the like. The pre-treatment chamber 130 can be embodied in one of commercially available free-standing PET dryers or can be integrated into the injection molding machine 160. It is worthwhile noting that the pre-treatment chamber 130 can be coupled to the inlet 110 (or to the hopper of the inlet 110, which is not depicted) by suitable conveying means, such as a chute for example, known to those skilled in the art and schematically depicted in FIG. 1 at 132. Accordingly, it can be said that the conveying means 132 are configured to convey PET material towards the inlet 110, the PET material that has been dried in the pre-treatment chamber 130.

It should be noted, however, that even though within the embodiment of FIG. 1, the pre-treatment chamber 130 is operatively coupled to the inlet 110 via the conveying means 132, this need not be so in every embodiments of the present invention. For example, in some alternative non-limiting embodiments of the present invention, the dried PET material can be manually transferred from the pre-treatment chamber 130 into the inlet 110. Also, the pre-treatment routine carried out in the pre-treatment chamber 130 and the feeding of the dried PET material through the inlet 110 can be executed substantially in series one after another or with certain time delay therebetween.

According to embodiments of the present invention, the injection unit 100 is further provided with a dosing unit 134 coupled to the inlet 110. More particularly, the dosing unit 134 is configured to feed, into the inlet 110 and through the feed throat 120, an amount of an un-treated agent 136, which is effectively mixed into the PET material that has been dried and which is being fed, in use, through the inlet 110. The dosing unit 134 can be operatively coupled to a source (not depicted) of the un-treated agent 136. This operative coupling can be executed by means of suitable conveying structure (not depicted) or by means of a manual transfer of the un-treated agent 136 from the source (not depicted) to the dosing unit 134. In some embodiments of the present invention, the dosing unit 134 can be implemented as any commercially available dosing unit 134, such as one used for adding master batch colorants. In some embodiments of the present invention, the dosing unit 134 can be volumetric-based. In alternative non-limiting embodiments of the present invention, the dosing unit 134 can be gravimetric-based. An example of an implementation of the dosing unit 134 can be embodied in a side-mount or floor-based model available from Plastrac Inc. of United States of America. In alternative non-limiting embodiments of the present invention, however, other implementations for the dosing unit 134 are possible.

In some embodiments of the present invention, as is the case within the embodiment of FIG. 1, the dosing unit 134 is configured to feed the un-treated agent 136 directly into the inlet 110 and through the feed throat 120. Within these embodiments of the present invention, the PET material and the un-treated agent 136 are effectively mixed by means of operation of the plasticizing screw 106. In alternative embodiments of the present invention, the injection unit 100 may include a pre-mixer (not depicted) operatively coupled in series between the pre-treatment chamber 130 and the inlet 110. Within these embodiments, the dosing unit 134 can be operatively coupled to the pre-mixer (not depicted). Within these embodiments of the present invention, the PET material and the un-treated agent 136 are effectively mixed within the pre-mixer (not depicted) and then fed directly into the feed throat 120 of the injection unit 100.

Broadly speaking, the un-treated agent 136 comprises an un-treated molding raw material (i.e. molding raw material that has not been dried or otherwise treated in the pre-treatment chamber 130) or an un-treated derivative thereof. In a specific implementation, the un-treated molding raw material is an un-treated PET material.

In some embodiments of the present invention, the un-treated agent 136 may comprise un-treated PET material (for example, un-treated PET granules). For the avoidance of doubt, within the context of embodiments of the present invention, the term "un-treated PET material" is meant to denote PET material that has not been dried in the pre-treatment chamber 130 or other similar structure or, in other words, the PET material that has not been dried or subjected to other similar treatments. In alternative non-limiting embodiments of the present invention, the un-treated agent 136 may comprise re-pelletized re-cycled PET, post-consumer recycled PET flakes, PET preform re-grind, PET bottle re-grind, PET scrap re-grind and the like. For the avoidance of doubt, it should be understood that PET scrap can come from either preform producing or blow-molding stages. Within these additional embodiments of the present invention, the un-treated agent 136 does not undergo any additional drying or other treatment in the pre-treatment chamber 130.

Accordingly, within non-limiting embodiments of the present invention, the un-treated agent 136 can be implemented as any suitable additive that effectively increases moisture content of the dried PET material, without significantly affecting other processing characteristics of the dried PET material. It can be said that a moisture content of the un-treated agent 136 is comparatively higher vis-à-vis a moisture content of the dried PET material fed from the pre-treatment chamber 130.

In some embodiments of the present invention, the un-treated agent 136 has an additional technical effect of lubricating the plasticizing screw 106. This is particularly true, but not limited to, those embodiments where the un-treated agent 136 includes PET preform re-grind, PET bottle re-grind, PET scrap re-grind, post-consumer recycled PET flakes and the like. Generally speaking, in those embodiments, where the un-treated agent 136 has one of a substantially amorphous structure or a semi-crystalline structure and, accordingly, a lower melting point; the un-treated agent 136 melts relatively faster than the PET material, effectively, providing additional lubrication for processing of the PET material. This can lead to decreased levels of shear and friction experienced by the PET material. This, additionally, may have a further positive effect on decreasing generation of acetaldehyde. Accordingly, within these embodiments of the present invention, it can be said that un-treated agent 136 is further configured to provide additional lubrication to the plasticizing screw 106 of the injection unit 100.

In yet further non-limiting embodiments of the present invention, the un-treated agent 136 may be implemented as a "combination agent" including some or all of un-treated PET material, re-pelletized re-cycled PET, post-consumer recycled PET flakes, PET preform re-grind, PET bottle re-grind, PET scrap re-grind and the like.

Figure 2:
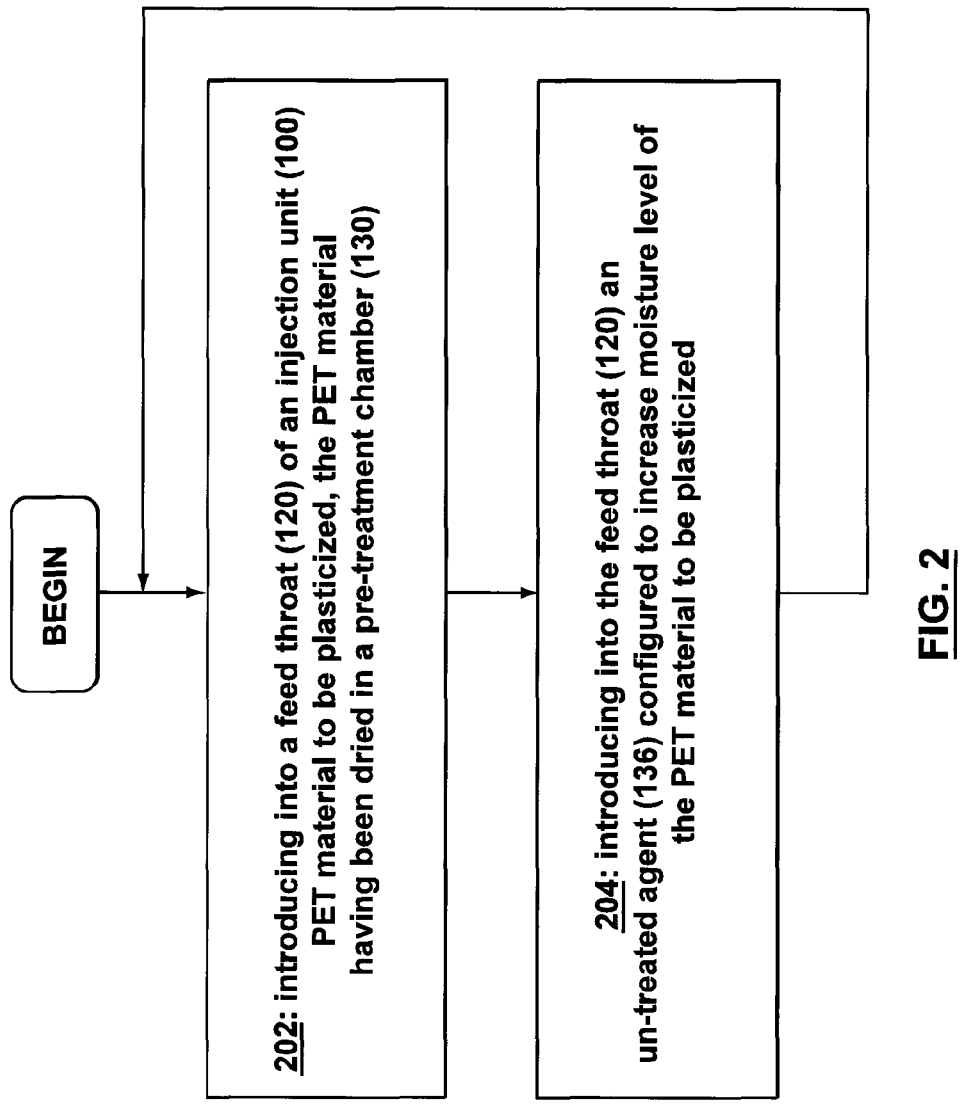
FIG. 2 depicts a non-limiting embodiment of a method 200 for decreasing the content of acetaldehyde, the method 200 being executable within the injection unit 100 of FIG. 1.

In a specific non-limiting example of the present invention where the un-treated agent 136 is PET preform re-grind, the un-treated agent 136 can be added in a proportion of 2% (two percent) of the amount of the PET material. In other embodiments of the present invention, the un-treated agent 136 can be added in a proportion selected from a range of between 0.1% and 30% of the PET material. In yet further non-limiting embodiments of the present invention, the un-treated agent 136 can be added in a proportion selected from a range of between 1% and 20% of the PET material. Those skilled in the art will appreciate that exact selection of the kind of the un-treated agent 136 and the amount of the un-treated agent 136 to be added will depend on several factors, which includes some or all of the following parameters: (a) desired viscosity of the processed PET material in order to ensure physical properties of the preforms (ex. monitoring IV level drops); (b) desired level of quality of the preforms in terms of clarity and the like; (c) ambient conditions around the injection molding machine 160. Given the architecture of FIG. 1, it is possible to execute a method for decreasing acetaldehyde content in a molded article, the method implemented according to a non-limiting embodiment of the present invention. A method 200 according to a non-limiting embodiment of the present invention will now be described in greater detail with reference to FIG. 2.

Step 202—Introducing into a Feed Throat 120 of an Injection Unit 100 a PET Material to be Plasticized, the PET Material Having been Dried in a Pre-Treatment Chamber 130

The method 200 starts at step 202, where molding raw material to be plasticized (i.e. PET material) is introduced into the feed throat 120 of the injection unit 100. Within embodiments of the present invention, the PET material has been subjected to pre-treatment in the pre-treatment chamber 130.

Step 204—Introducing into the Feed Throat 120 a Un-Treated Agent 136 Configured to Increase Moisture Level of the PET Material to be Plasticized The method 200 further includes, at step 204, introducing the un-treated agent 136. Step 204 can be conveniently executed by the dosing unit 134.

The method 200 then loops back to execution of step 202. The method 200 continues to execute while the injection unit 100 operates to plasticize the PET material.

It is worthwhile noting that the dosing unit 134 can execute step 204 under control of suitable control logic, such as a suitable computing apparatus (not depicted) or a controller (not depicted) associated with the injection molding machine 160.

Even though FIG. 1 depicts the injection unit 100 of a two-stage type, this need not be so in every embodiment of the present invention. Those skilled in the art will easily appreciate that teachings of the present invention equally apply to a reciprocating screw single-stage injection unit (not depicted). Similarly, even though examples presented herein above have dealt with injection molding, embodiments of the present invention will equally apply of other types of molding article forming techniques, such as compression molding, transfer molding and the like.

In some embodiments of the present invention, method 200 can be implemented in a closed loop control manner. In other words, execution of the method 200 can be controlled substantially in real-time by a closed loop control routine. For example, in some embodiments of the present invention, as part of executing the modified version of method 200, the above-mentioned suitable computing apparatus (not depicted) or a controller (not depicted), which can be implemented as the dedicated controller (not depicted) for the injection unit 100 and/or the injection molding machine 160, can implement the closed loop control routine.

Within these embodiments of the present invention, the controller 132 (or another type of a computing apparatus) receives an indication of an operational parameter from the injection unit 100 and/or the injection molding machine 160. Within these embodiments, the operational parameter is indicative of the current level of the acetaldehyde within material being plasticized by the injection unit 100. In some embodiments of the present invention, the operational parameter can be the actual indication of the acetaldehyde level. The current level of acetaldehyde can be measured, for example, by using off-the-shelf or proprietary real-time (or near real-time) measurement devices 134 for acetaldehyde levels. In some embodiments of the present invention, measurement of the current level of acetaldehyde can be based on a sample of preforms being molded. An example of a suitable system is disclosed in a US patent application bearing a publication number 2005/0175510 published on Aug. 11, 2005 to Marabini et al. other suitable systems and equipment can, of course, be used. Within these embodiments of the present invention, the indication of the operational parameter can be manually inputted into the controller or, alternatively, communicated electronically from the suitable systems and equipment for measuring the current level of acetaldehyde to the controller.

In other embodiments of the present invention, the operational parameter can be an indication of a proxy value which can be used for appreciating the current level of acetaldehyde. For example, the proxy value used can be an indication of current viscosity. This value can also be measured using off-the-shelf measurement devices. For example, a Viscosensor from Dynisco can be used.

Within these embodiments of the present invention, if the indication of the operational parameter is indicative of a currently increased level of acetaldehyde (as determined, for example, based on a pre-determined threshold), the closed loop control routine can trigger execution of step 204 of method 200 or, alternatively and/or additionally, to increase the dose of the un-treated agent 136 being added. Similarly, if the indication of the operational parameter is indicative of the current level of acetaldehyde being within an acceptable level (as determined, for example, based on the pre-determined threshold), the closed loop control routine can cause temporary suspension of execution of step 204 and/or decreased dosage of the un-treated agent 136 being added.

To summarize, within these embodiments of the present invention, as part of method 200 a closed loop control routine is executed. As part of executing the closed loop control routine, an indication of an operational parameter is received and then analyzed. Execution of the closed loop control routine can trigger execution of the step 204 and/or control an amount of the un-treated agent 136 being added as part of executing step 204.

A technical effect of embodiments of the present invention includes producing a molded article with at least decreased content of acetaldehyde. An additional technical effect of some embodiments of the present inventions provides a more cost-effective method that allows to at least decrease content of acetaldehyde in molded article compared to the methods that rely on adding acetaldehyde inhibitors and other similar methods. Yet another technical effect of embodiments of the present invention provides for a method and system for decreasing acetaldehyde content, by relying on increasing the moisture level of the dried PET material right at the feed throat 120 and additionally/optionally providing additional lubrication to the plasticizing screw 106. It should be noted that not each and every technical effects needs to be enjoyed, in its entirety, in each and every embodiment of the present invention.

Description of the non-limiting embodiments of the present inventions provides examples of the present invention, and these examples do not limit the scope of the present invention. It is to be expressly understood that the scope of the present invention is limited by the claims. The concepts described above may be adapted for specific conditions and/or functions, and may be further extended to a variety of other applications that are within the scope of the present invention. Having thus described the non-limiting embodiments of the present invention, it will be apparent that modifications and enhancements are possible without departing from the concepts as described. Therefore, what is to be protected by way of letters patent are limited only by the scope of the following claims:

What is claimed is:

1. An injection unit, comprising:
   an inlet having a feed throat for accepting, in use, PET material that has been dried in a pre-treatment chamber;
   a plasticizing sub-system for plasticizing the PET material into plasticized material;
   an outlet for outputting the plasticized material;
   a dosing unit, the dosing unit being operatively coupled to a source of an un-treated agent, the dosing unit being configured to introduce into the feed throat the un-treated agent configured to increase moisture level of the PET material to be plasticized, wherein the dosing unit is configured to introduce the un-treated agent in the form of PET granules having a moisture content that is comparatively higher than that of the PET material fed from the pre-treatment chamber 130;
   a measurement device that is configured to provide an indication of an operational parameter indicative of a current level of acetaldehyde within the material being plasticized;
   a controller configured to execute a closed loop control routine, wherein the closed loop control routine comprises receiving an indication of the operational parameter indicative of the current level of acetaldehyde and responsive to the operational parameter being indicative of an increased current level of acetaldehyde, the closed loop control routine being configured to execute:
   (i) triggering execution of introducing into the feed throat an un-treated agent configured to increase moisture level of the PET material to be plasticized; and
   (ii) during said introducing, controlling an amount of the un-treated agent being added.

2. The injection unit of claim 1, wherein said un-treated agent has one of an amorphous structure and a semi-crystalline structure.

3. The injection unit of claim 1, the plasticizing sub-system further including a plasticizing screw operatively mounted within a barrel, wherein the un-treated agent is further configured to provide additional lubrication to the plasticizing screw.

4. The injection unit of claim 1, wherein said un-treated agent comprises re-pelletized re-cycled PET.

5. The injection unit of claim 1, wherein said un-treated agent comprises post-consumer recycled PET flakes.

6. The injection unit of claim 1, wherein said un-treated agent comprises PET preform re-grind.

7. The injection unit of claim 1, wherein said un-treated agent comprises PET bottle re-grind.

8. The injection unit of claim 1, wherein said un-treated agent comprises PET scrap re-grind.

9. The injection unit of claim 1, wherein said un-treated agent comprises a combination agent.

10. The injection unit of claim 1, wherein the dosing unit is configured to introduce the un-treated agent directly into the feed throat, whereby the un-treated agent is mixed with the PET material during plasticizing.

11. The injection unit of claim 1, further comprising a pre-mixer that is operatively couplable in series between the pre-treatment chamber and the feed throat and to the dosing unit, the pre-mixer being configured to mix the un-treated agent with the PET material prior to introduction to the feed throat.

* * * * *